United States Patent
Shapiro et al.

(10) Patent No.: US 7,568,185 B1
(45) Date of Patent: Jul. 28, 2009

(54) MECHANISM FOR PROGRAM-ASSISTED TRACING ACTIONS

(75) Inventors: Michael W. Shapiro, San Francisco, CA (US); Bryan M. Cantrill, San Francisco, CA (US); Adam H. Leventhal, San Francisco, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 1030 days.

(21) Appl. No.: 10/823,009

(22) Filed: Apr. 13, 2004

(51) Int. Cl.
G06F 9/44 (2006.01)

(52) U.S. Cl. .................................. 717/130

(58) Field of Classification Search ......... 717/124–130, 717/158; 714/43, 45; 719/316; 718/100; 711/136
See application file for complete search history.

(56) References Cited

U.S. PATENT DOCUMENTS 6,728,955 B1 * 4/2004 Berry et al. ................ 717/158
6,769,117 B2 * 7/2004 Moore ........................ 717/130
7,043,668 B1 * 5/2006 Treue et al. ................. 714/45
7,055,070 B1 * 5/2006 Uhler et al. ................. 714/45

OTHER PUBLICATIONS

John Murayama, "Performance Profiling Using TNF", Jul. 2001, p. 1-6.*
SunSoft, "Programming Utilities Guide", 1995, Sun Microsystems, chp. 1, pp. 1-70 (attached as Sun_802-1952_ch1.pdf).*

* cited by examiner

*Primary Examiner*—Tuan Anh Vu
(74) *Attorney, Agent, or Firm*—Osha • Liang LLP

(57) ABSTRACT

A method for tracing an instrumented application, including loading the instrumented application into a kernel level to obtain a corresponding instrumented process, registering a helper action with a tracing framework, tracing the instrumented process using the tracing framework, wherein tracing comprises triggering a probe in the instrumented process, determining whether the helper action is associated with the probe, and performing the helper action if the helper action is associated with the probe.

9 Claims, 4 Drawing Sheets

MECHANISM FOR PROGRAM-ASSISTED TRACING ACTIONS

BACKGROUND

A tracing framework is a collection of software routines and tools that permits a user to record activity of one or more executing programs, including an operating system kernel. Tracing frameworks typically permit users to describe one or more probes to indicate locations in a program that can be used as data-recording sites. The probes are associated with one or more actions that describe what is to be done when the program's execution encounters the probe. Tracing frameworks typically provide a defined set of actions at each probe, a set of user-selectable actions, or the ability to execute an essentially arbitrary set of actions composed in a high-level programming language. In tracing frameworks that support a programming language for describing actions, language statements are compiled into an intermediate form or directly into machine code and are then executed when the probe triggers.

In a tracing framework for an operating system kernel that provides the ability to specify actions using language statements, the set of actions may include the ability to trace data in the memory address space of both the operating system kernel and one or more user process address spaces. The capability to access both user and kernel memory from a tracing action permits users of the tracing framework to observe the state of both kernel and user-mode software simultaneously observing the state allows analysis of the relationship between the states at a given point in time. However, the ability to usefully trace and examine data in memory from either the kernel or a user process requires an understanding of the data layout (i.e., the definition of the various relevant data structures).

For example, the data structure of interest may be the execution stack representing the current control flow of the thread that triggered a particular probe. In order to provide the ability to record a stack (commonly referred to as a stack trace) from either a user or kernel thread, the tracing framework (or its user) utilizes knowledge of the manner in which activation records are allocated on the stack, how to locate the saved program counter address associated with each record (commonly referred to as a stack frame), how to convert these addresses to meaningful names associated with the program's symbol table and source code, etc.

In some instances, the aforementioned details are fixed for a given operating system implementation on a given processor, and thus is readily available for the tracing framework (or user) to determine and use. However, in other instances if the stack trace for a user process is requested and the user process is an interpreter or virtual machine of some kind (e.g., a BASIC interpreter, a LISP interpreter, a Java Virtual Machine (JVM), etc.), then potentially multiple stacks of interest to the user of the tracing framework may exist. For example, the user may be interested in the native stack of the interpreter or virtual machine process (e.g., the stack trace of one of the JVM's threads), the stack of the program that the interpreter or virtual machine is executing (e.g., a stack trace of one of the Java threads executing inside of the JVM), etc.

In the aforementioned scenario, the stack traces are themselves described by a set of data structures that are associated with the implementation of the interpreter or the virtual machine. Accordingly, in order for the tracing framework to effectively record information from such stack traces, the tracing framework (or the user) typically requires knowledge of the data structures of interest in each of the different stack traces.

SUMMARY

In general, in one aspect, the invention relates to a method for tracing an instrumented application, comprising loading the instrumented application into a kernel level to obtain a corresponding instrumented process, registering a helper action with a tracing framework, tracing the instrumented process using the tracing framework, wherein tracing comprises triggering a probe in the instrumented process, determining whether the helper action is associated with the probe, and performing the helper action if the helper action is associated with the probe.

In general, in one aspect, the invention relates to a system comprising an instrumented application comprises a probe, wherein the probe is associated with an action, a helper action associated with the instrumented application, and a tracing framework configured to trace an instrumented process corresponding to the instrumented application and to execute the helper action if the action is associated with the helper action.

In general, in one aspect, the invention relates to a network system having a plurality of nodes, comprising an instrumented application comprises a probe, wherein the probe is associated with an action, a helper action associated with the instrumented application, and a tracing framework configured to trace an instrumented process corresponding to the instrumented application and to execute the helper action if the action is associated with the helper action, wherein the instrumented application executes on any one of the plurality of nodes, wherein the helper action is located on any one of the plurality of nodes, and wherein the tracing framework executes on any one of the plurality of nodes.

Other aspects of the invention will be apparent from the following description and the appended claims.

DETAILED DESCRIPTION

Figure 1:
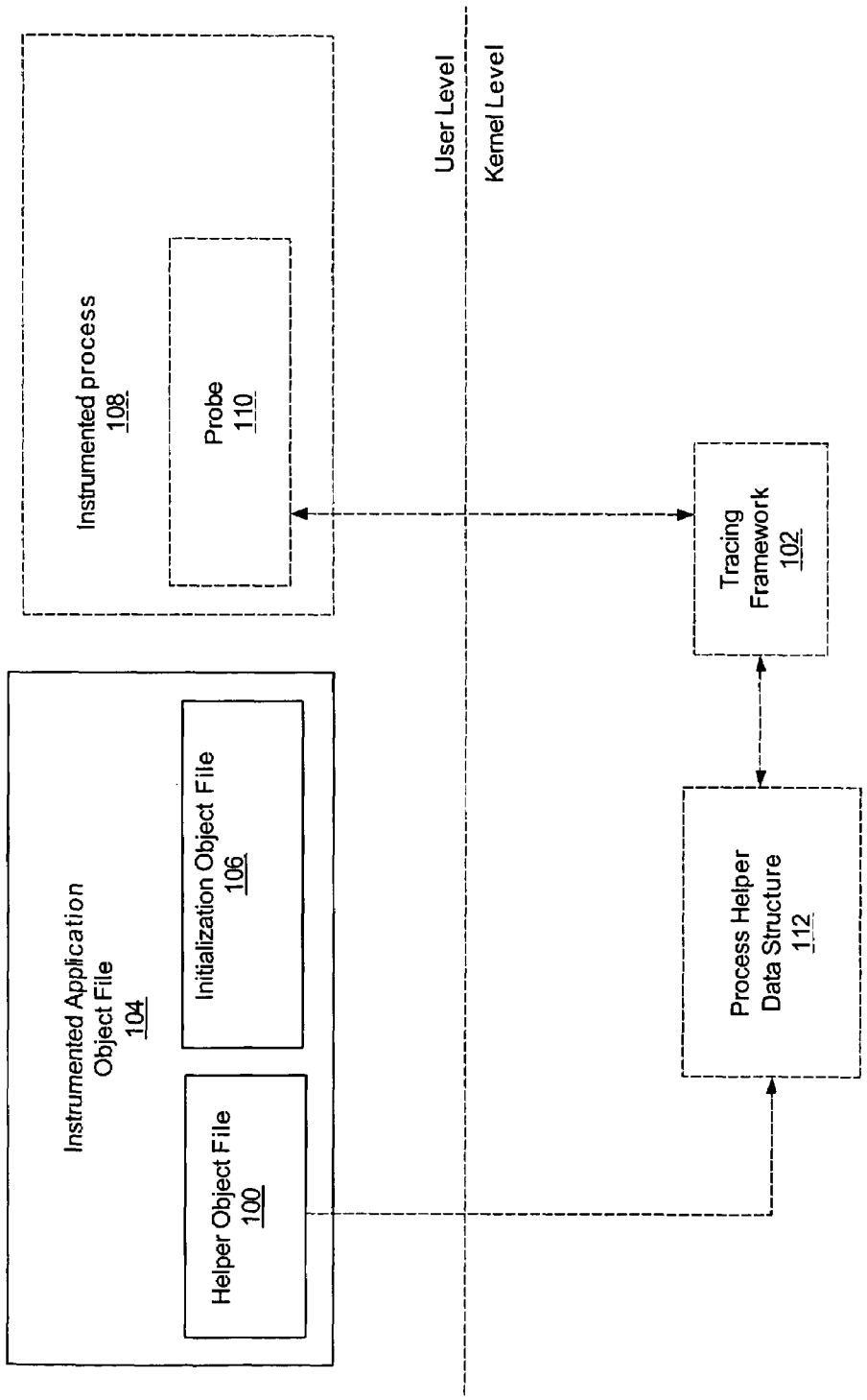
FIG. 1 shows a flow diagram in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, in one or more embodiments of the invention relate to a tracing framework. More specifically, one or more embodiments of the invention provide a method and apparatus enabling the tracing framework to obtain stack traces for a number of different processes without requiring the tracing framework to initially have any specific understanding of the implementation data structures associated with the different processes. Further, embodiments of the invention provide a means for the tracing framework to allow an application to define a set of stored procedures (i.e., Helper actions) that can be exported to the tracing framework and executed when the user of the tracing framework requests that data, such as a stack trace, be recorded from the view of a particular user process. More specifically, one or more embodiments of the invention provide a method and apparatus to allow a user to define a function that is callable by the tracing framework to augment the generic functions provided by the tracing framework.

FIG. 1 shows a flow diagram in accordance with one embodiment of the invention. Initially, an application is compiled to produce an object file (i.e., Instrumented Application Object File (104)). The instrumented application object file (104) is subsequently linked to an initialization object file (106). The initialization object file (106) contains routines to be executed when the instrumented application object file (104) is loaded into the kernel. Specifically, in one embodiment of the invention, the initialization object file (106) includes routines to load a helper object file (100) into the kernel-level at a location known by the tracing framework (102).

In one embodiment of the invention, the helper object file (100) includes one or more helper actions associated with the instrumented application. The helper actions include specific routines that may be used by a tracing framework (102) when tracing the instrumented application. The helper actions are typically generated using specific knowledge of the instrumented application data structures. In one embodiment of the invention, the specific knowledge about the data structures associated with the instrumented application corresponds to information about the data structures associated with a particular version of the instrumented application, a particular implementation of the instrumented application (e.g., a particular application executing on a UNIX-based operating system), etc. In one embodiment of the invention, the helper actions are initially written in a high level language (e.g., C++, Java, a proprietary language understood by the tracing framework, etc.). The helper actions defined by the source code are based on specific knowledge about the data structures associated with the instrumented application to be traced by a tracing framework (102).

The helper actions written in the high-level language are subsequently compiled into byte code, which is then encoded in a format recognized by the tracing framework (102). The encoded byte code is then embedded into an operating system standard object file format (e.g., ELF, COFF, etc.), to generate the helper object file (100).

Once the aforementioned components have been generated and linked, the instrumented application object file (104) may be executed on the system. The instrumented application object file (104) is executed and becomes a running instrumented process (108). As shown. in FIG. 1, the instrumented process (108) includes at least one probe (110). The loading of the instrumented application object file (104) also triggers the initialization object file (106) to load the helper object file (100) into the kernel level. The contents of the helper object file (100) are stored in a process helper data structure (112) residing in the kernel level.

In one embodiment of the invention, one process helper data structure (112) is associated with each instrumented process (108). Alternatively, a single process helper data structure (112) may include helper actions associated with more than one instrumented process (108). Regardless of which of the aforementioned embodiments are implemented, when a probe (110) is encountered during tracing of the instrumented program, a tracing framework (102) determines what action to perform. In one embodiment of the invention, the tracing framework (102) includes functionality to determine and execute the action(s) (generic tracing actions or helper actions) associated with the probe (110).

In one embodiment of the invention, the tracing framework (102) includes a set of generic tracing actions. The generic tracing actions correspond to actions that the tracing framework (102) can perform when a probe is encountered (i.e., tracing actions that are not specific to the instrumented process (108)). The set of generic tracing actions may be supplemented by helper actions (i.e., tracing actions that are specific to the instrumented process (108) or a set of instrumented processes) residing in the process helper data structure (112). Thus, in one embodiment of the invention, the tracing framework includes functionality to perform any action from the set of generic tracing actions as well as any helper action defined in the process helper data structure (112)

In one embodiment of the invention, the tracing framework (102) determines what tracing action to perform (generic tracing action or helper action), by querying internal data structures associated with the tracing framework (102). If the tracing framework (102) determines that the tracing action to perform is a generic tracing action, then the tracing framework (102) performs the generic tracing action. Alternatively, if the tracing framework (102) determines that a helper action is to be performed, then the tracing framework (102) obtains the helper action from the process helper data structure (112) and executes the helper action using the tracing framework's (102) virtual machine interpreter (not shown). Alternatively, the tracing framework (102) may perform both a generic tracing action and a helper action for each probe (110).

Alternatively, in one embodiment of the invention, the individual tracing actions in the set of generic tracing actions may be augmented by helper actions present in the process helper data structure (112). Thus, in one embodiment of the invention, a helper action may replace the corresponding tracing action in the set of generic tracing actions. For example, the name associated with the generic tracing action may also be used to identify the helper action in the process helper data structure (112). Thus, when a probe (110) associated with the generic tracing action is encountered, the tracing framework (102) may find and execute the corresponding helper action and not execute the generic tracing action.

Figure 2:
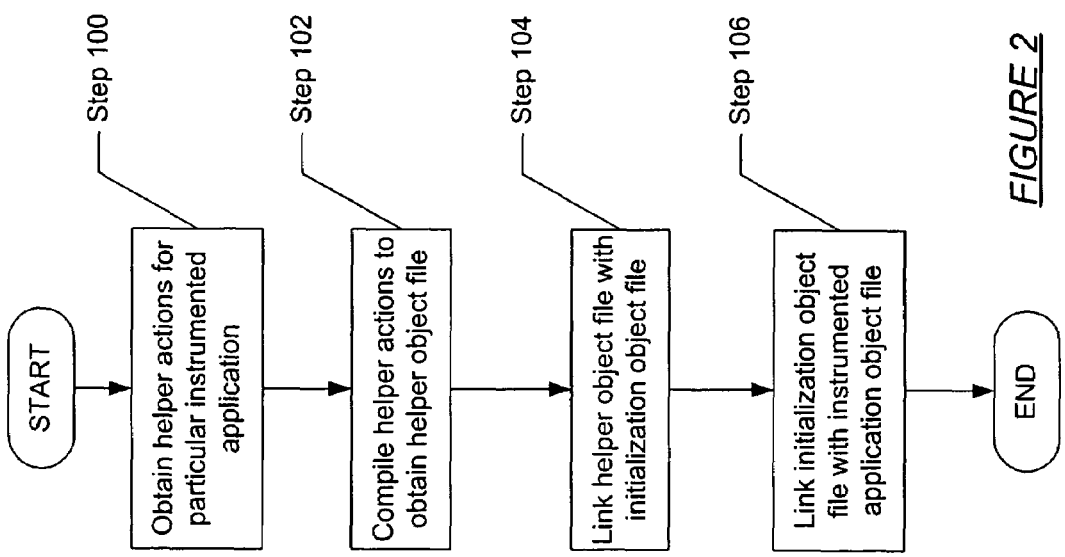
FIG. 2 shows a flowchart in accordance with one embodiment of the invention.

FIG. 2 shows a flowchart in accordance with one embodiment of the invention. Initially, helper actions for a particular instrumented process are obtained (Step 100). The helper actions are subsequently compiled into byte code, encoded, and embedded into an object file to obtain a helper object file (Step 102). The helper object file is subsequently linked with an initialization object file (Step 104). The initialization object file is subsequently linked to the instrumented application object file (Step 106). Those skilled in the art will appreciate that while the aforementioned object files (i.e., helper object file (100), initialization object file (106), and instrumented application object file (104)) have been described as separate entities, the individual object files may be grouped together and form components of a single object file.

Figure 3:
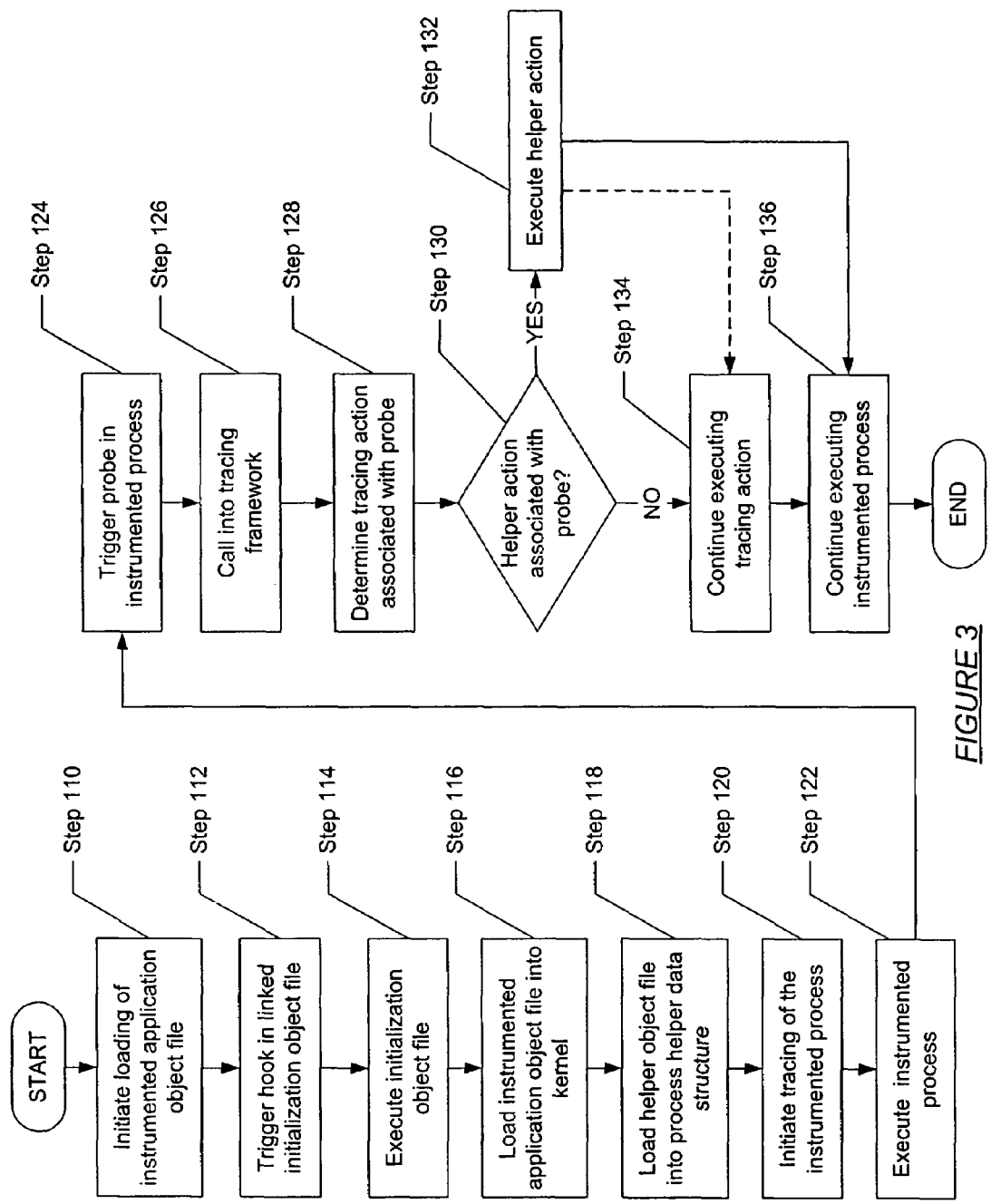
FIG. 3 shows a flowchart in accordance with one embodiment of the invention.

FIG. 3 shows a flowchart in accordance with one embodiment of the invention. The following flow chart describes an embodiment of how to use the linked object files (i.e., helper object file, initialization file, instrumented application object file) described above. Initially, a user (or a process controlled by the user) initiates loading of the instrumented application object file (Step 110). Initiating the loading of the instrumented application object file triggers a hook in the linked initialization object file (Step 112). The initialization object file is subsequently executed (Step 114). More specifically, the execution of the initialization object file triggers loading of the instrumented application object file into the kernel (Step 116). In addition, the execution of the initialization object file prompts the loading the contents of the helper object file into the corresponding process helper data structure (Step 118). At this stage, all the components to enable tracing within helper actions are loaded into the kernel.

Tracing of the instrumented process (i.e., the kernel level representation of the instrumented application object file) is subsequently initiated (Step 120). In one embodiment of the invention, initiating the tracing includes requesting the tracing framework to initiate tracing. The instrumented process is subsequently executed (Step 122). When a probe is encountered during the execution of the tracing framework (Step 124), the thread that encountered the probe while executing the instrumented process calls into the tracing framework (Step 126). The tracing framework then proceeds to determine the action (generic tracing action and/or helper action) associated with the probe (Step 128).

Specifically, the tracing frame determines whether a helper action (i.e., an action defined in the process helper data structure) associated with the probe (Step 130). If a helper action associated with the probe is found (typically, determined by querying the process helper data structure), then the tracing framework executes the helper action (Step 132). If no helper action associated with the probe, then the tracing framework executing the generic tracing action (i.e., the generic action defined by the tracing framework) (Step 134). Regardless of whether the tracing framework executes a helper action or a generic tracing action, once the tracing framework has executed an action associated with the probe, then the tracing framework returns control to the thread that encountered the probe. The thread then continues executing the instrumented process (Step 136).

In one embodiment of the invention, the tracing framework may execute both the helper action and a tracing action associated with a given probe (as indicated by the dashed line in FIG. 3). Those skilled in the art will appreciate that while embodiments of the invention were described above with respect to only executing one or two actions (i.e., a helper action or/and a generic tracing action), the invention may be extended to allow multiple tracing actions and helper actions to be associated with a given probe.

The following example describes an implementation of the invention on the Solaris™ (Solaris is a trademark of Sun Microsystems, Inc) in accordance with one embodiment of the invention. This example is not intended to limit the scope of the application. Further, the functionality provided by the following example may be practiced on any OS. For example, the invention may also be implemented on Windows® (Windows is a registered trademark of the Microsoft Corporation), Max OS® (Mac OS is a registered trademark of Apple Computer Inc.), etc. Note that the invention may also be practiced on operating systems that are not listed above.

Initially, helper actions appropriate for the application are defined by the application author and compiled into byte code, encoded and stored as an object file in an object file format understood by the tracing framework. The object file is subsequently embedded inside of an ELF-format object file within a section named ".SUNW_dtrace." The embedded object file is then linked with an object file containing initialization code and stored on the system in the file "/usr/lib/dtrace/drti.o." The initialization code is invoked because it is referred to by an entry in an ELF ".init" section. The object file resulting from the previous step is then stored at "/usr/lib/dtrace/drti.o." The object file is subsequently linked is then linked with the remainder of the application using a standard "/usr/ccs/bin/ld" utility.

When the application is executed by a user, the initialization code linked to the application is executed. The execution of the initialization code prompts the initialization code to locate the helper actions embedded in the object file. The helper actions are located in the object file using standard APIs provided by the "/usr/lib/ld.so.1" dynamic linker. Once the helper actions have been located within the object file, the initialization code relocates any references to application symbols in the helper actions using the current memory addresses for those symbols according to the symbol tables for the current process. Access to the symbol tables for the current process may be obtained using standard APIs provided by "/usr/lib/ld.so.1".

Once the symbol tables have been updated, the initialization code executes a system call to open a pseudo-device driver file provided by the tracing framework. The initialization code then executes an ioctl( ) system call to upload the relocated helper actions into the kernel level and store them in a data structure associated with the per-process proc_t data structure (i.e., the process specific data structure). This data structure may be duplicated if the instrumented process executes a fork( ) system call, allowing the helper actions to propagate to additional child instrumented processes of the same application.

When a tracing action is executed for which helper actions are present, the tracing framework checks the per-process proc_t data structure and determines whether any helper actions are associated with the instrumented process. For each matching helper, the helper action is executed using the tracing framework's virtual machine interpreter to execute the helper actions and these results are then made available. In this particular embodiment, helper actions may be invoked from arbitrary kernel context; the helper action execution only relies on the ability to load addresses from the current user-level address space in addition to the other standard services provided by the tracing framework's virtual machine interpreter.

Figure 4:
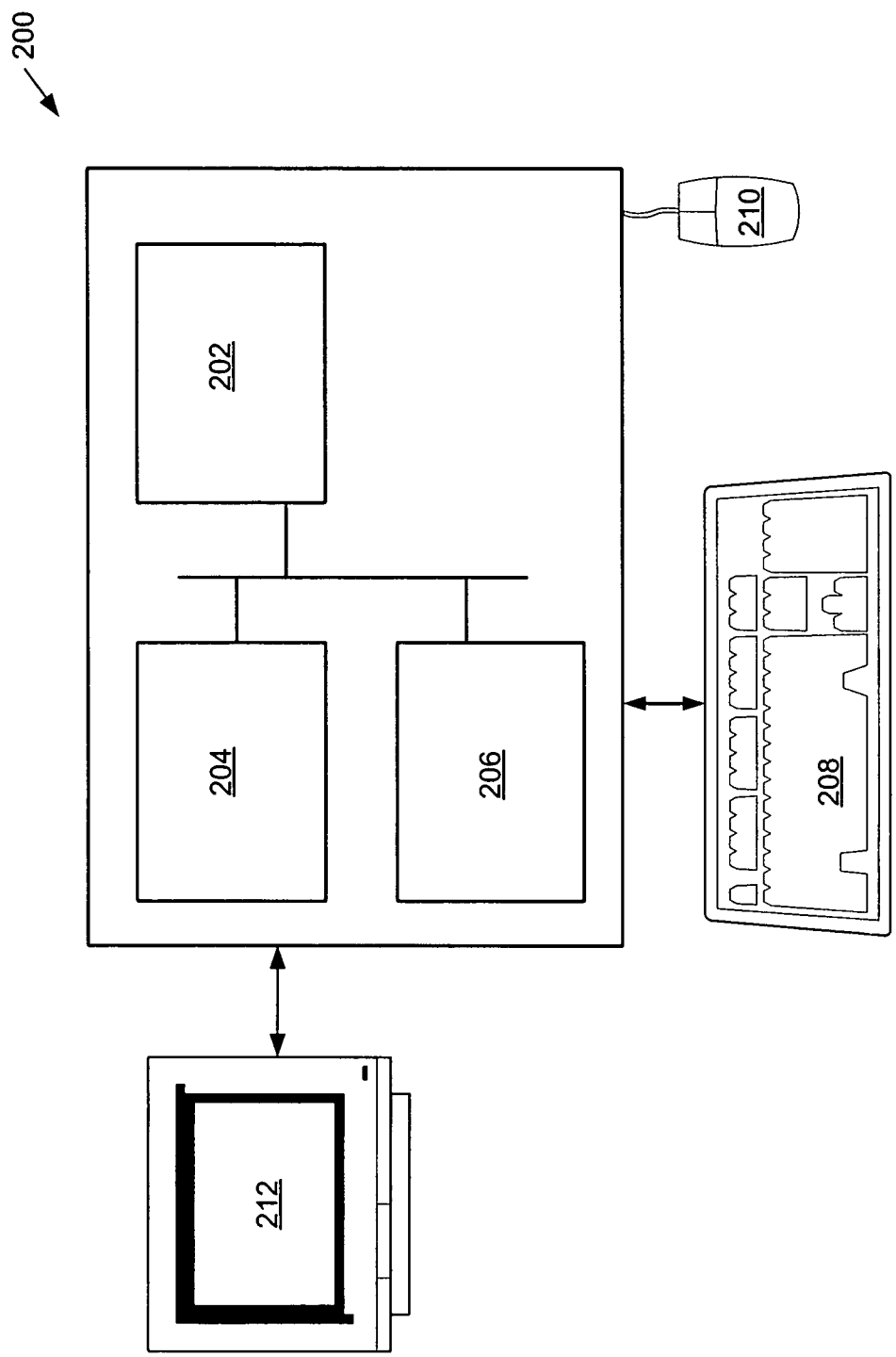
FIG. 4 shows a computer system in accordance with one embodiment of the invention.

The invention may be implemented on virtually any type of computer regardless of the platform being used. For example, as shown in FIG. 4, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (400) is connected to a local area network (LAN) or a wide area network (e.g., the Internet) via a network interface connection (not shown). Those skilled in the art will appreciate that these input and output means may take other forms. Further, those skilled in the art will appreciate that one or more elements of the aforementioned computer (200) may be located at a remote location and connected to the other elements over a network. Further, the invention may be implemented on a distributed system having a plurality of nodes, where each portion of the invention (i.e., the helper action, the instrumented application, the tracing framework, etc.) may be located on a different node within the distributed system. In one embodiment of the invention, the node corresponds to a computer system. Alternatively, the node may correspond to a processor with associated physical memory.

Those skilled in the art will appreciate that while the invention has been described with respect to tracing of compiled instrumented applications, the invention may be extended to operate with interpreted instrumented applications.

One or more embodiments of the invention permit the integrated tracing of any user-level and kernel-level activity that requires knowledge of the implementation details and algorithms associated with an instrumented application. Further, embodiments of the invention provide a means whereby an application can define a set of stored procedures that can be exported to the tracing framework and executed when the user of the tracing framework requests that data such as a stack trace be recorded.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for tracing an instrumented application, comprising:
    loading the instrumented application object file comprising a probe into a kernel level to obtain a corresponding instrumented process;
    triggering, after loading the instrumented application object file, a hook in an initialization object file to load a helper object file into a kernel level for use by a tracing framework,
        wherein the initialization object file is linked to the instrumented application object file,
        wherein the helper object file comprises a helper action,
        wherein the helper action is a stored procedure generated using an implementation specific detail associated with the instrumented application object file for obtaining a stack trace of the instrumented process,
        wherein the helper object file is linked to the initialization object file,
        wherein loading the helper object file comprises storing the helper action in a process helper data structure in the kernel level,
        wherein the process helper data structure is accessible to the tracing framework;
    registering the helper action with the tracing framework to associate the probe with the helper action loaded in the process helper data structure;
    tracing the instrumented process using the tracing framework, wherein the probe is encountered during the tracing of the instrumented process;
    upon encountering the probe, determining, by querying the process helper data structure, whether the helper action loaded in the process helper data structure is associated with the probe;
    obtaining the helper action from the process helper data structure when the helper action is associated with the probe; and
    performing the helper action to obtain the stack trace of the instrumented process when the helper action is associated with the probe.

2. The method of claim 1, wherein the process helper data structure is associated with the instrumented process.

3. The method of claim 1, wherein the implementation specific detail comprises at least one selected from the group consisting of an instrumented application data structure and an instrumented application algorithm.

4. The method of claim 3, wherein the instrumented application data structure comprises an application stack.

5. A computer system, comprising:
    a processor configured to:
        load an instrumented application object file comprising a probe associated with an action into a kernel level to obtain a corresponding instrumented process;
        load, in response to triggering a hook in an initialization file object file associated with the instrumented application object file, a helper object file into the kernel level for use by a tracing framework,
            wherein the initialization object file is linked to the instrumented application object file,
            wherein the helper object file comprises a helper action,
            wherein the helper action is a stored procedure generated using an implementation specific detail associated with the instrumented application for obtaining a stack trace of the instrumented process,
            wherein the helper object file is linked to the initialization file object file,
            wherein loading the helper object file comprises storing the helper action in a process helper data structure in the kernel level, and
            wherein the process helper data structure is accessible to the tracing framework;
        register the helper action with the tracing framework to associate the probe with the helper action loaded in the process helper data structure;
        execute the tracing framework, wherein the tracing framework is configured to:
            trace the instrumented process, wherein the probe is encountered during the tracing of the instrumented process;
            upon encountering the probe, determining, by querying the process helper data structure, whether the helper action loaded in the process helper data structure is associated with the probe;
            obtain the helper action from the process helper data structure when the helper action is associated with the probe; and
            perform the helper action to obtain the stack trace of the instrumented process when the helper action is associated with the probe, and
    a storage device configured to store the stack trace of the instrumented process.

6. The system of claim 5, wherein the implementation specific details comprise at least one selected from the group consisting of an instrumented application data structure and an instrumented application algorithm.

7. The system of claim 6, wherein the instrumented application data structure comprises an application stack.

8. The system of claim 7, wherein the application stack comprises at least one selected from the group consisting of an interpreter stack and a virtual machine stack.

9. The system of claim 5, wherein the process helper data structure is associated with instrumented process.

* * * * *